(12) United States Patent
Collier-Hallman

(10) Patent No.: US 7,157,878 B2
(45) Date of Patent: Jan. 2, 2007

(54) TRANSIENT COMPENSATION VOLTAGE ESTIMATION FOR FEEDFORWARD SINUSOIDAL BRUSHLESS MOTOR CONTROL

(75) Inventor: Steven James Collier-Hallman, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 14 days.

(21) Appl. No.: 10/300,146

(22) Filed: Nov. 19, 2002

(65) Prior Publication Data
US 2004/0095089 A1   May 20, 2004

(51) Int. Cl.
G05B 19/10 (2006.01)

(52) U.S. Cl. .............. 318/567; 318/561; 318/472; 318/783; 318/721; 700/45

(58) Field of Classification Search .......... 318/560, 318/567, 568–569, 432, 439
See application file for complete search history.

(56) References Cited

U.S. PATENT DOCUMENTS

| | | | |
|---|---|---|---|
| 3,898,544 A | 8/1975 | Tanikoshi | 318/254 |
| 3,919,609 A | 11/1975 | Klautschek et al. | 318/227 |
| 4,027,213 A | 5/1977 | de Valroger | 318/138 |
| 4,135,120 A | 1/1979 | Hoshimi et al. | 318/138 |
| 4,217,508 A | 8/1980 | Uzuka | 310/46 |
| 4,240,020 A | 12/1980 | Okuyama et al. | 318/721 |
| 4,392,094 A | 7/1983 | Kühnlein | 318/254 |
| 4,447,771 A | 5/1984 | Whited | 18/661 |
| 4,511,827 A | 4/1985 | Morinaga et al. | 318/254 |
| 4,513,898 A * | 4/1985 | Spitsbergen | 226/44 |
| 4,556,811 A | 12/1985 | Hendricks | 310/266 |
| 4,558,265 A | 12/1985 | Hayashida et al. | 318/561 |
| 4,633,157 A | 12/1986 | Streater | 318/723 |
| 4,686,437 A | 8/1987 | Langley et al. | 318/254 |
| 4,688,655 A | 8/1987 | Shimizu | 180/79.1 |
| 4,721,894 A | 1/1988 | Graber | 318/473 |
| 4,745,984 A | 5/1988 | Shimizu | 180/79.1 |
| 4,769,583 A * | 9/1988 | Goor | 318/568.18 |
| 4,780,658 A | 10/1988 | Koyama | 318/808 |
| 4,789,040 A | 12/1988 | Morishita et al. | 180/142 |
| 4,835,448 A | 5/1989 | Dishner et al. | 318/254 |
| 4,837,692 A | 6/1989 | Shimizu | 364/424.05 |
| 4,868,477 A | 9/1989 | Anderson et al. | 318/696 |
| 4,868,970 A | 9/1989 | Schultz et al. | 29/596 |

(Continued)

FOREIGN PATENT DOCUMENTS

WO   WO 200120751 A2 *  3/2001

OTHER PUBLICATIONS

De La Ree, Jaime; and Latorre, Jaime; "Permanent Magnet Machines Torque Considerations," *Conference Record of the IEEE Industry Applications Society Annual Meeting Part I*, IEEE Catalog No. 88CH2565-0, Part 1, Oct. 2-7, 1988; pp. 32-37.

(Continued)

*Primary Examiner*—Lincoln Donovan
*Assistant Examiner*—Renata McCloud
(74) *Attorney, Agent, or Firm*—Michael D. Smith

(57) ABSTRACT

A method for controlling a voltage mode controlled electric machine comprising: receiving a torque value representative of a desired torque; obtaining a speed value indicative of a rotational velocity of the electric machine; acquiring a phase advance value indicative of a desired phase advance angle; generating a voltage command responsive to the torque value, the position value; the generating is responsive to the torque value, the speed value, and the phase advance value.

16 Claims, 2 Drawing Sheets

U.S. PATENT DOCUMENTS

| | | | | |
|---|---|---|---|---|
| 4,882,524 A | 11/1989 | Lee | | 318/254 |
| 4,912,379 A | 3/1990 | Matsuda et al. | | 318/254 |
| 4,988,273 A | 1/1991 | Faig et al. | | 425/145 |
| 4,992,717 A | 2/1991 | Marwin et al. | | 318/696 |
| 5,006,774 A | 4/1991 | Rees | | 318/721 |
| 5,040,629 A | 8/1991 | Matsuoka et al. | | 180/79.1 |
| 5,063,011 A | 11/1991 | Rutz et al. | | 264/126 |
| 5,069,972 A | 12/1991 | Versic | | 428/407 |
| 5,076,381 A | 12/1991 | Daido et al. | | 180/79.1 |
| 5,122,719 A | 6/1992 | Bessenyei et al. | | 318/629 |
| 5,175,479 A | * 12/1992 | Tajima et al. | | 318/560 |
| 5,223,775 A | 6/1993 | Mongeau | | 318/432 |
| 5,239,490 A | 8/1993 | Masaki et al. | | 364/565 |
| 5,331,245 A | 7/1994 | Burgbacher et al. | | 310/186 |
| 5,345,156 A | 9/1994 | Moreira | | 318/254 |
| 5,349,278 A | 9/1994 | Wedeen | | 318/632 |
| 5,361,210 A | 11/1994 | Fu | | 364/424.05 |
| 5,379,741 A | * 1/1995 | Matysiewicz et al. | | 123/497 |
| 5,428,285 A | 6/1995 | Koyama et al. | | 318/799 |
| 5,433,541 A | 7/1995 | Hieda et al. | | 400/279 |
| 5,444,341 A | 8/1995 | Kneifel, II et al. | | 318/432 |
| 5,460,235 A | 10/1995 | Shimizu | | 180/79.1 |
| 5,461,293 A | 10/1995 | Rozman et al. | | 318/603 |
| 5,467,275 A | 11/1995 | Takamoto et al. | | 364/426.01 |
| 5,469,215 A | 11/1995 | Nashiki | | 318/432 |
| 5,475,289 A | 12/1995 | McLaughlin et al. | | 318/432 |
| 5,493,200 A | 2/1996 | Rozaman et al. | | 322/10 |
| 5,517,415 A | 5/1996 | Miller et al. | | 364/424.05 |
| 5,554,913 A | 9/1996 | Ohsawa | | 318/434 |
| 5,568,389 A | 10/1996 | McLaughlin et al. | | 364/424.05 |
| 5,569,994 A | 10/1996 | Taylor et al. | | 318/700 |
| 5,579,188 A | 11/1996 | Dunfield et al. | | 360/99.08 |
| 5,585,708 A | 12/1996 | Richardson et al. | | 318/800 |
| 5,616,999 A | 4/1997 | Matsumura et al. | | 318/632 |
| 5,623,409 A | 4/1997 | Miller | | 364/424.51 |
| 5,625,239 A | 4/1997 | Persson et al. | | 310/68 B |
| 5,625,269 A | * 4/1997 | Ikeda | | 318/696 |
| 5,642,044 A | 6/1997 | Weber | | 324/207.25 |
| 5,656,911 A | 8/1997 | Nakayama et al. | | 318/718 |
| 5,668,721 A | 9/1997 | Chandy | | 701/41 |
| 5,672,944 A | 9/1997 | Gokhale et al. | | 318/254 |
| 5,701,065 A | 12/1997 | Ishizaki | | 318/701 |
| 5,739,650 A | 4/1998 | Kimura et al. | | 318/254 |
| 5,744,921 A | * 4/1998 | Makaran | | 318/254 |
| 5,777,449 A | 7/1998 | Schlager | | 318/459 |
| 5,780,986 A | 7/1998 | Shelton et al. | | 318/432 |
| 5,803,197 A | 9/1998 | Hara et al. | | 180/248 |
| 5,811,905 A | 9/1998 | Tang | | 310/179 |
| 5,852,355 A | 12/1998 | Turner | | 318/701 |
| 5,881,836 A | 3/1999 | Nishimoto et al. | | 180/446 |
| 5,898,990 A | 5/1999 | Henry | | 29/598 |
| 5,919,241 A | 7/1999 | Bolourchi et al. | | 701/41 |
| 5,920,161 A | 7/1999 | Obara et al. | | 318/139 |
| 5,929,590 A | 7/1999 | Tang | | 318/701 |
| 5,962,999 A | 10/1999 | Nakamura et al. | | 318/432 |
| 5,963,706 A | 10/1999 | Baik | | 388/804 |
| 5,967,253 A | 10/1999 | Collier-Hallman | | 180/421 |
| 5,977,740 A | 11/1999 | McCann | | 318/701 |
| 5,984,042 A | 11/1999 | Nishimoto et al. | | 180/446 |
| 5,992,556 A | 11/1999 | Miller | | 180/446 |
| 6,002,226 A | 12/1999 | Collier-Hallman et al. | | 318/439 |
| 6,002,234 A | 12/1999 | Ohm et al. | | 318/729 |
| 6,009,003 A | 12/1999 | Yeo | | 363/37 |
| 6,013,994 A | 1/2000 | Endo et al. | | 318/432 |
| 6,034,460 A | 3/2000 | Tajima et al. | | 310/179 |
| 6,034,493 A | 3/2000 | Boyd et al. | | 318/254 |
| 6,043,624 A | 3/2000 | Masaki et al. | | 318/723 |
| 6,049,182 A | 4/2000 | Nakatani et al. | | 318/432 |
| 6,064,172 A | * 5/2000 | Kuznetsov | | 318/716 |
| 6,092,618 A | 7/2000 | Collier-Hallman | | 180/422 |
| 6,104,150 A | 8/2000 | Oohara et al. | | 318/254 |
| 6,129,172 A | 10/2000 | Yoshida et al. | | 180/446 |
| 6,184,638 B1 | 2/2001 | Kinpara | | 318/432 |
| 6,281,650 B1 | * 8/2001 | Yutkowitz | | 318/561 |
| 6,281,659 B1 | 8/2001 | Giuseppe | | 318/799 |
| 6,323,614 B1 | * 11/2001 | Palazzolo et al. | | 318/560 |
| 6,344,721 B1 | * 2/2002 | Seki et al. | | 318/254 |
| 6,411,052 B1 | 6/2002 | Mir et al. | | 318/434 |
| 6,470,225 B1 | * 10/2002 | Yutkowitz | | 700/44 |
| 6,720,751 B1 | * 4/2004 | Plasz et al. | | 318/567 |
| 2003/0209235 A1 | * 11/2003 | Javaherian | | 123/674 |

OTHER PUBLICATIONS

De La Ree, Jaime; and Boules, Nady; "Torque Production In Permanent-Magnet Synchronous Motors", Jan. Feb. 1989, *IEEE Transactions On Industry Applications*, vol. 25 No. 1; pp. 107-112.

Mirkazemi-moud, Mehran; Green, Tim C.; and Williams, Barry W.; "Analysis and Cpmparison of Real-Time Sine-Wave Generation for PMW Circuits", Jan. 1993, *IEEE Transactions On Power Electronics*, vol. 8, No. 1; pp. 46-54.

Murai, Yoshihiro; Kawase, Yoshihiro; and Ohashi, Karuharu; "Torque Ripple Improvement for Brushless DC Miniature Motors," *Conference Record of the 1987 IEEE Industry Applications Society Annual Meeting Part 1*, IEEE Catalog No. 87CH2499-2, Oct. 18-23, 1987; pp. 21-28.

Parasiliti, Francesco; Petrella, Roberto; and Tursini, Marco; "Low Cost Phase Current Sensing in DSP Based AC Drives," *IEEE Transactions*, pp. 1284-1289.

*Brown Boveri Review*, "Static Frequency Changers with "Subharmonic" Control in Conjunction with Reversible Variable-Speed A.C. Drives," Aug./Sep. 1964, vol. 51, No. 8/9; pp. 555-577.

* cited by examiner

TRANSIENT COMPENSATION VOLTAGE ESTIMATION FOR FEEDFORWARD SINUSOIDAL BRUSHLESS MOTOR CONTROL

BACKGROUND

Most modern vehicles have power steering in which the force exerted by the operator on the steering wheel is assisted by hydraulic pressure from an electric or engine-driven pump. The force applied to the steering wheel is multiplied by the mechanical advantage of a steering gear. In many vehicles, the steering gear is a rack and pinion, while in others it is a recirculating ball type.

Electric power steering is commonly used in vehicles to improve fuel economy and has started to replace hydraulic power steering in some vehicles. One way this is accomplished is through the reduction or elimination of losses inherent in traditional steering systems. Therefore, electric power steering typically requires power only on demand. Commonly, in such systems an electronic controller is configured to require significantly less power under a small or no steering input condition. This dramatic decrease from conventional steering assist is the basis of the power and fuel savings. Electric power steering has several additional advantages. The steering feel provided to the operator has greater flexibility and adaptability. Overall system mass savings may also be achieved. Electric power steering is powerplant independent, which means it can operate during an all electric mode on a vehicle.

Furthermore, polyphase permanent magnet (PM) brushless motors excited with a sinusoidal field provide lower torque ripple, noise, and vibration when compared with those excited with a trapezoidal field. Theoretically, if a motor controller produces polyphase sinusoidal currents with the same frequency and phase as that of the sinusoidal back electromotive force (EMF), the torque output of the motor will be a constant, and zero torque ripple will be achieved. However, due to practical limitations of motor design and controller implementation, there are always deviations from pure sinusoidal back EMF and current waveforms. Such deviations usually result in parasitic torque ripple components at various frequencies and magnitudes. Various methods of torque control can influence the magnitude and characteristics of this torque ripple.

One method of torque control for a permanent magnet motor with a sinusoidal, or trapezoidal back EMF is accomplished by controlling the motor phase currents so that the current vector is phase aligned with the back EMF. This control method is known as current mode control. In this a method, the motor torque is proportional to the magnitude of the current. However, current mode control requires a more complex controller for digital implementation and processing. The controller would also require multiple current sensors and A/D channels to digitize the feedback from current sensors, which would be placed on the motor phases for phase current measurements.

Another method of torque control is termed voltage mode control. In voltage mode control, the motor phase voltages are controlled in such a manner as to maintain the motor flux sinusoidal and motor backemf rather than current feedback is employed. Voltage mode control also typically provides for increased precision in control of the motor, while minimizing torque ripple. One application for an electric machine using voltage mode control is the electric power steering system (EPS) because of its fuel economy and ease-of-control advantages compared with the traditional hydraulic power steering. However, commercialization of EPS systems has been limited due to cost and performance challenges. Among the most challenging technical issues are a pulsation at the steering wheel and the audible noise associated with voltage mode control.

To satisfy the needs of certain applications for precise and accurate control, current mode control employing motor phase current feedback may be utilized, in lieu of the voltage mode control method wherein no current feedback occurs. That is, current mode control is a closed loop methodology in that a current feedback in addition to the motor position and speed feedback is used as controlling parameter by the current mode control, while voltage mode control is an open loop control methodology wherein only position and speed feedback is used. Voltage mode control systems may be more desirable in certain applications because the need for external sensors to provide feedback is minimized.

Therefore, in a voltage control system, it is desirable to enhance motor control to improve controllability and reduce motor control errors.

BRIEF SUMMARY

Disclosed herein is a method for controlling a voltage mode controlled electric machine comprising: receiving a torque value representative of a desired torque; obtaining a speed value indicative of a rotational velocity of the electric machine; acquiring a phase advance value indicative of a desired phase advance angle; generating a voltage command responsive to the torque value, the position value; the generating is responsive to the torque value, the speed value, and the phase advance value.

Also disclosed herein is a system for controlling a voltage mode controlled electric machine comprising: a PM electric machine; a sensor operably connected to the electric machine and configured to measure at least one of a rotor velocity and a rotor position of the electric machine and transmit at least one of a velocity signal and a position signal; a controller, the controller operably connected to the electric machine and the sensor, the controller receives at least one of a velocity signal and a position signal and generates a voltage command for the electric machine. The voltage command is responsive to the at least one of a velocity signal and a position signal, a desired torque value and a phase advance value.

Further disclosed herein is a storage medium encoded with a machine-readable computer program code, the computer program code including instructions for causing controller to implement the above mentioned method for controlling a voltage mode controlled electric machine.

Also disclosed herein is a computer data signal, the data signal comprising code configured to cause a controller to implement the abovementioned method for controlling a voltage mode controlled electric machine.

BRIEF DESCRIPTION OF THE DRAWINGS

The present invention will now be described, by way of an example, with references to the accompanying drawings, wherein like elements are numbered alike in the several figures in which.

DETAILED DESCRIPTION OF THE PREFERRED EMBODIMENT

Figure 2:
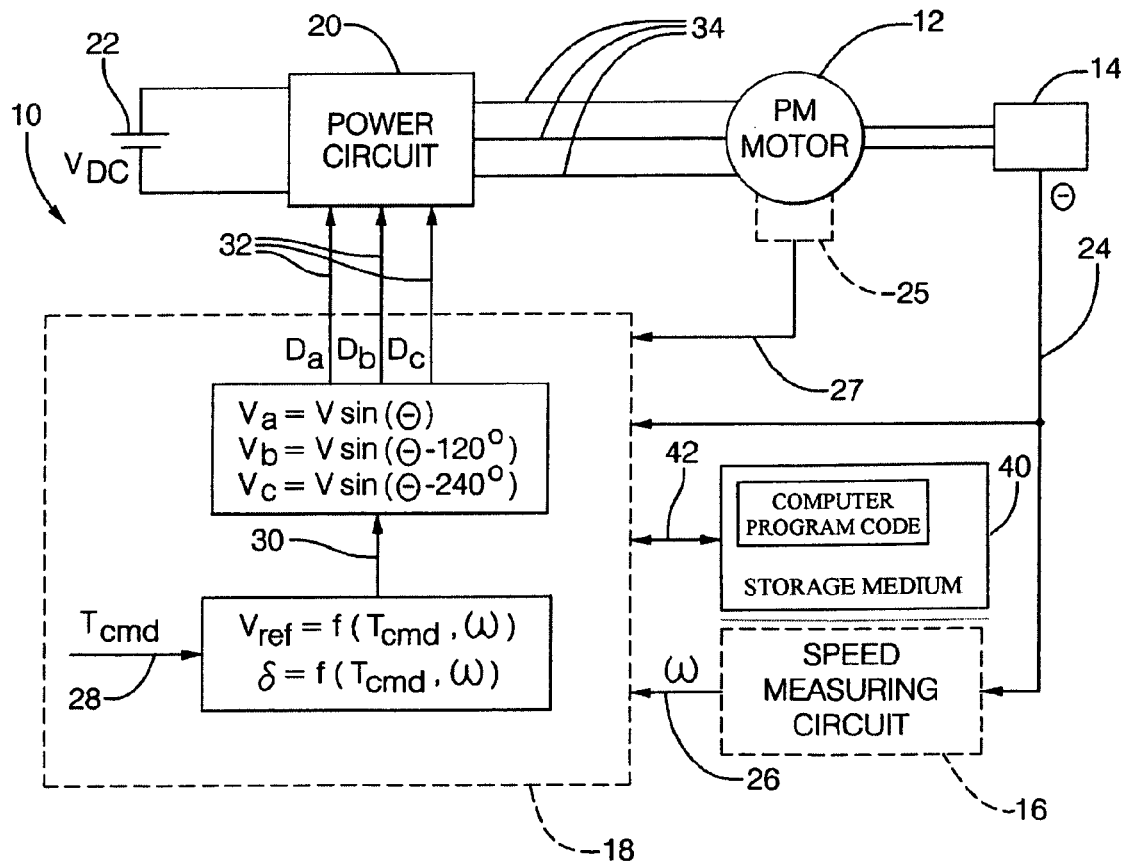
FIG. 2 is a drawing depicting a voltage mode controlled PM motor drive system.

Referring now to the drawings in detail, FIG. 2 depicts a PM motor system 10 where numeral 10 generally indicates a system for controlling the torque of a sinusoidally excited PM electric machine 12 (e.g. a motor, hereinafter referred to as a motor). The system includes, but is not limited to, a motor rotor position encoder 14, a speed measuring circuit 16, a controller 18, power circuit or inverter 20 and power source 22. Controller 18 is configured to develop the necessary voltage(s) out of inverter 20 such that, when applied to the motor 12, the desired torque is generated. Because these voltages are related to the position and speed of the motor 12, the position and speed of the rotor are determined. A rotor position encoder 14 is connected to the motor 12 to detect the angular position of the rotor denoted θ. The encoder 14 may sense the rotary position based on optical detection, magnetic field variations, or other methodologies. Typical position sensors include potentiometers, resolvers, synchros, encoders, and the like, as well as combinations comprising at least one of the forgoing. The position encoder 14 outputs a position signal 24 indicating the angular position of the rotor.

The motor speed denoted $\omega_m$ may be measured, calculated or a combination thereof. Typically, the motor speed $\omega_m$ is calculated as the change of the motor position θ as measured by a rotor position encoder 14 over a prescribed time interval. For example, motor speed $\omega_m$ may be determined as the derivative of the motor position θ from the equation $\omega_m = \Delta\theta/\Delta t$ where $\Delta t$ is the sampling time and $\Delta\theta$ is the change in position during the sampling interval. Another method of determining speed depending upon the type of encoder employed for the motor position θ, may be to count the position signal pulses for a predetermined duration. The count value is proportional to the speed of the motor. In the figure, a speed measuring circuit 16 determines the speed of the rotor and outputs a speed signal 26.

The temperature of the motor 12 is optionally measured utilizing one or more temperature sensors 25 preferably located at the motor windings. The temperature sensor transmits a temperature signal 27 to the controller 18 to facilitate the processing prescribed herein. Typical temperature sensors include thermocouples, thermistors, thermostats, and the like, as well as combinations comprising at least one of the foregoing sensors, which when appropriately placed provide a calibratable signal proportional to the particular temperature. In an exemplary embodiment temperature signal 27 is employed to schedule selected signals and parameters of the motor 12. For example, the motor resistance, inductance, and motor constant may be scheduled as a function of temperature to improve the accuracy of the model and algorithms disclosed herein.

The position signal 24, speed signal 26, temperature signal 27, and a torque command signal 28 are applied to the controller 18. The torque command signal 28 is representative of the desired motor torque value. The controller 18 processes all input signals to generate values corresponding to each of the signals resulting in a rotor position value, a motor speed value, a temperature value and a torque command value being available for the processing in the algorithms as prescribed herein. Measurement signals, such as the abovementioned are also commonly linearized, compensated, and filtered as desired or necessary to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

The controller 18 determines the voltage amplitude $V_{ref}$ 30 required to develop the desired torque by using the position signal 24, speed signal 26, and torque command signal 28, and other fixed motor parameter values. For a three-phase motor, three sinusoidal reference signals that are synchronized with the motor back EMF $\vec{E}$ are required to generate the required motor input voltages. The controller 18 transforms the voltage amplitude signal $V_{ref}$ 30 into three phases by determining phase voltage command signals $V_a$, $V_b$, and $V_c$ from the voltage amplitude signal 30 and the position signal 24 according to the following equations:

$$V_a = V_{ref}\sin(\theta)$$

$$V_b = V_{ref}\sin(\theta - 120°)$$

$$V_c = V_{ref}\sin(\theta - 240°)$$

In a motor drive system employing phase advancing, the phase advancing angle δ (FIG. 1) may also be calculated as a function of the input signal for torque or speed. The phase voltage signals $V_a$, $V_b$, $V_c$ are then phase shifted by this phase advancing angle δ. Phase voltage command signals $V_a$, $V_b$ and $V_c$ are used to generate the motor duty cycle signals $D_a$, $D_b$, and $D_c$ 32 using an appropriate pulse width modulation (PWM) technique. Motor duty cycle signals 32 of the controller 18 are applied to a power circuit or inverter 20, which is coupled with a power source 22 to apply phase voltages 34 to the stator windings of the motor in response to the motor voltage command signals.

In order to perform the prescribed functions and desired processing, as well as the computations therefore (e.g., the execution of voltage mode control algorithm(s), the inverse motor model prescribed herein, and the like), controller 18 may include, but not be limited to, a processor(s), computer (s), memory, storage, register(s), timing, interrupt(s), communication interfaces, and input/output signal interfaces, as well as combinations comprising at least one of the foregoing. For example, controller 18 may include signal input signal filtering to enable accurate sampling and conversion or acquisitions of such signals from communications interfaces. Additional features of controller 18 and certain processes therein are thoroughly discussed at a later point herein.

In an exemplary embodiment, controller 18 computes the desired voltage amplitude 30 for the motor by evaluating selected system parameters and processing a closed loop non-linear filtering technique to implement a simplified model for the dynamics of the motor under selected operational conditions. Controller 18 receives the abovementioned input signals to facilitate the processes and as a result generates one or more output signals including voltage commands.

In order to facilitate enhanced operation of a voltage control motor, the of the control algorithm implementing an inverse motor model facilitates computation of a desired command voltage amplitude 30 as a function of the desired torque command, motor speed and phase advance angle. In the exemplary embodiment, the required voltage amplitude 30 is computed as a function of the torque command 28, motor speed signal 26, and motor parameters. In addition, the motor parameters may also be compensated for variations due to temperature.

To obtain an understanding of the processing performed by controller 18 for establishing an approximate inverse motor model, an understanding of the mathematical foundation of a voltage mode controlled PM motor is beneficial. Therefore, a development of the equations is provided herein.

Figure 1:
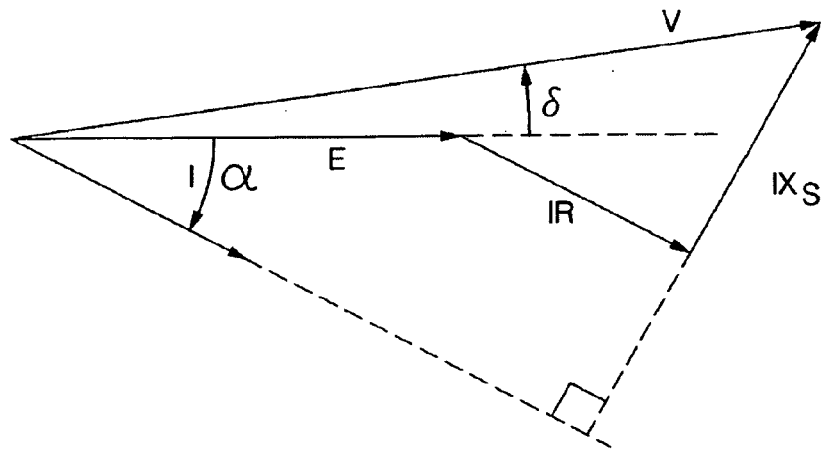
FIG. 1 depicts a phasor diagram for a PM motor.

The voltage mode control method is based on electric machine operation phasor diagram as shown in FIG. 1. Under steady state operating condition, the voltage phasor $\vec{V}$, back EMF phasor $\vec{E}$ and current phasor $\vec{I}$ of a sinusoidally excited PM motor are governed by:

$$\vec{V} = \vec{E} + \vec{I}R + j\vec{I}X_s \qquad (1)$$

where R is the winding resistance, $X_s$ is the phase reactance which is equal to the product of motor inductance $L_s$ and the excitation frequency $\omega_e$. Here, it is denoted that the angle between back EMF phasor $\vec{E}$ and current phasor $\vec{I}$ is $\alpha$ and the angle between the voltage phasor $\vec{V}$ and the back EMF phasor $\vec{E}$ is $\delta$.

The equation for calculation of actual motor current vector $\vec{I}$ (which is the peak of sine current wave) is derived from the motor torque and voltage equations in the following manner.

The torque T of a PM machine under steady state is given by $$T = K_e I \cos \alpha \qquad (2)$$

where again $\vec{I}$ is the phase current, $\alpha$ is the angle between back EMF and current and $K_e$ is the motor torque constant.

Now from the diagram, the voltage equations of the motor can be written as:

$$V \cos \delta = E + IR \cos \alpha + IX_s \sin \alpha \qquad (3)$$

or $$V \cos(\delta) = \left(\frac{L}{R}s + 1\right) R I_q + K_e \omega_m + L\omega_e I_d \qquad (3a)$$

$$V \sin \delta = -IR \sin \alpha + IX_s \cos \alpha \qquad (4)$$

or $$-V \sin(\delta) = \left(\frac{L}{R}s + 1\right) R I_d - L\omega_e I_q \qquad (4a)$$

where:
V—is the magnitude of the applied Voltage;
δ—is the angle of the applied Voltage relative to the back emf;
α—is the angle of the Current relative to the back emf;
L—is the stator inductance;
R—is the stator resistance;
$K_e$—is the motor constant;
$\omega_m$—is the rotor mechanical velocity;
$\omega_e$—is the rotor electrical velocity;
I—is the total current;
$I_d$—is the direct axis current;
$I_q$—is the quadrature axis current; and
s—is the Laplace operator.

It will be appreciated that Equations (3) and (4) or (3a) and (4a) represent two common methods of denoting the motor voltages, the primary distinction between them is that Equations (3a) and (4a) use the direct and quadrature notation for the current. The distinction is merely notational and is provided here for clarity.

One known way to control the torque of such a machine is to invert the steady state form of the above equations, solve for the voltage in terms of the other parameters and thereby compute a voltage command required to achieve a desired torque. This may be accomplished by first setting s=0 (effectively ignoring dynamics) and then solving for V as a function of delta, Torque, velocity, and motor parameters. This method results in the following equation:

Solving equations (3) and (4) or (3a) and (4a) yields:

$$I \cos \alpha = \frac{(V \cos \delta - E)R + X_s V \sin \delta}{(R^2 + X_s^2)} \qquad (5)$$

or $$I_q = \frac{(V \cos(\delta) - K_e \omega_m)R + L\omega_e V \sin(\delta)}{R^2 + (\omega_e L)^2} \qquad (5a)$$

Therefore, the torque T from (2) can be written as:

$$T_e = K_e I_q \quad \text{or} \quad T = K_e \frac{(V \cos \alpha - E)R + X_s V \sin \alpha}{Z^2} \qquad (6)$$

where $Z = \sqrt{R^2 + (\omega_e L)^2}$ $T_e$—is the electromagnetic torque

Substituting for $E = K_e \cdot \omega_m$, the torque equations can be rewritten as $$T = \frac{K_e}{Z^2} \left[ VR \cos \delta - K_e \omega_m R + \omega_e LV \sin \delta \right] \qquad (7)$$

Finally, solving for the voltage V yields:

$$V = \frac{\frac{T_e R}{K_e}\left(1 + \left(\frac{\omega_e L}{R}\right)^2\right) + K_e \omega_m}{\cos(\delta) + \frac{\omega_e L}{R} \sin(\delta)} \qquad (8)$$

It is noteworthy to appreciate that Equation (8) is an expression in terms of known or measurable parameters of the motor 12, torque, and the computed phase advance angle, δ (delta). If the motor parameters, motor velocity, and δ (delta) are known accurately, this method of control produces a good approximation of the desired torque under steady state conditions. However, under transient conditions, the approximation of setting the Laplace operator to zero may introduce substantial errors in the voltage command and thereby, in the torque control of the motor.

An exemplary embodiment as disclosed herein corrects the potential torque error by creating a method of including dynamic effects in the "motor inverse model". Observation of the two voltage equations (3) and (4) or (3a) and (4a) respectively, illustrates that the relationships are nonlinear and therefore Laplace operations do not apply. However, it will be further appreciated that the single term in each equation that contains dynamics (frequency dependent terms) is linear and therefore may be modeled using Laplace techniques. Therefore, it will be appreciated that if the equations can be expressed as a combination of linear and nonlinear equations with the dynamic information explicitly kept in the linear portions and the voltage V as an output, a dynamic "motor inverse model" equation may be obtained. In order to achieve this, Equation (4), (4a) is solved for $I_d$ as follows:

$$I_d = \frac{L\omega_e I_q - V\sin(\delta)}{R\left(\frac{L}{R}s+1\right)} \quad (9)$$

Then substitute into Equation (3) or (3a) as follows:

$$V\cos(\delta) = \left(\frac{L}{R}s+1\right)RI_q + K_e\omega_m + L\omega_e\left(\frac{L\omega_e I_q - V\sin(\delta)}{R\left(\frac{L}{R}s+1\right)}\right) \quad (10)$$

Lastly, substituting in the torque, yields:

$$V\cos(\delta) = \left(\frac{L}{R}s+1\right)R\frac{T_e}{K_e} + K_e\omega_m + L\omega_e\left(\frac{L\omega_e T_e/K_e - V\sin(\delta)}{R\left(\frac{L}{R}s+1\right)}\right) \quad (11)$$

It may now be recognized that Equation 11 is an implicit equation for the voltage V. However, the voltage V on the right hand side (as multiplied by $\sin(\delta)$) is subject to the dynamics exhibited in the denominator. These dynamics essentially mean that the voltage V also experiences a delay in time. Therefore, it will be appreciated, that a closed loop nonlinear filter may be designed and implemented to solve Equation (11) real time as an implicit equation without the need for an explicit solution.

Figure 3:
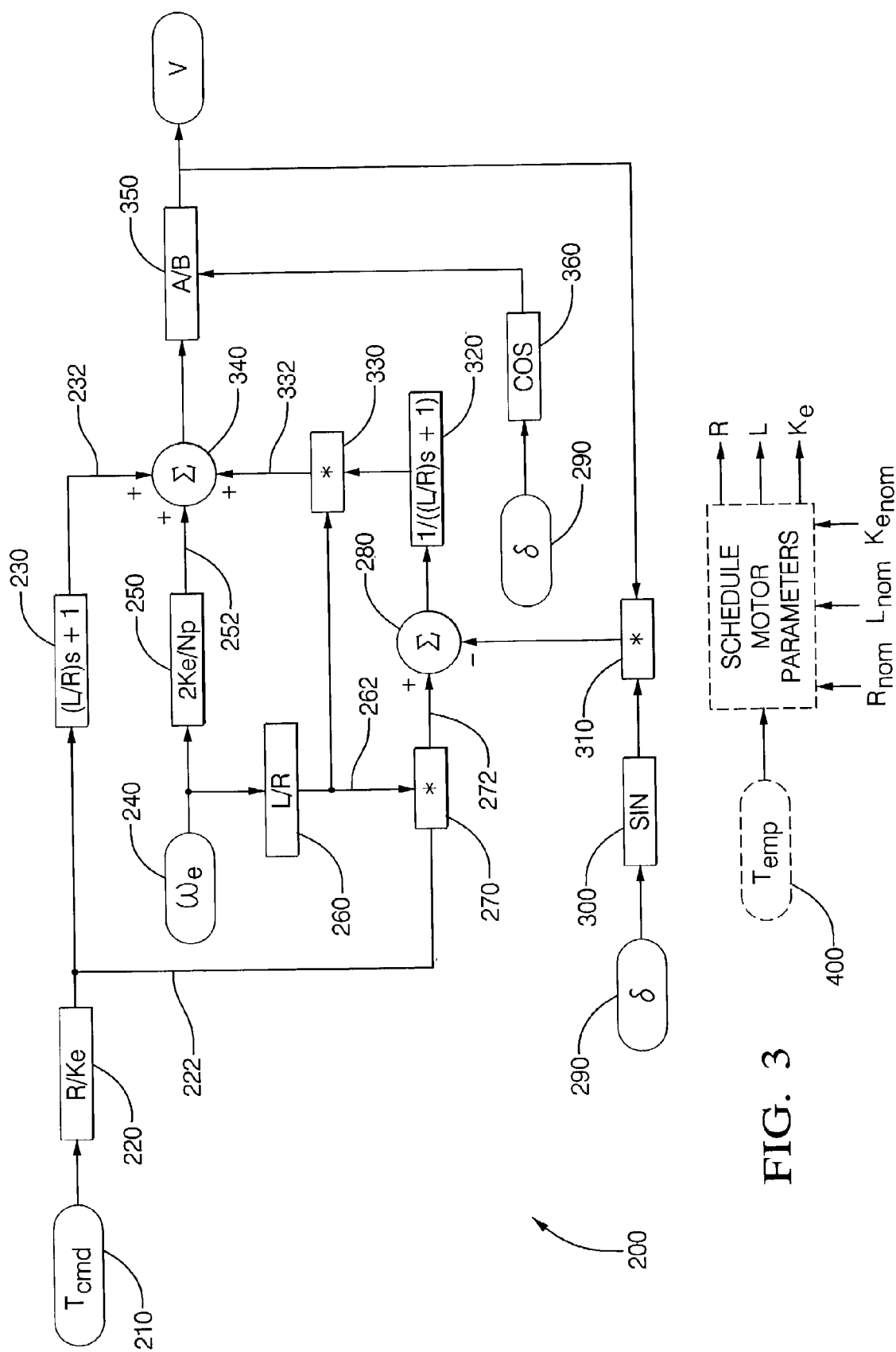
FIG. 3 is a simplified block diagram depicting an exemplary closed loop non-linear implementation of an implicit equation.

FIG. 3 is a block diagram that illustrates an implementation of the inverse motor model process 200 including the abovementioned filter. Turning to the figure, the implementation may be by way of processes implemented in a controller or processor such as controller 18. The process 200 initiates with receiving the torque command at block 210 followed by a multiplication by the quotient $R/K_e$ as depicted at block 220 to formulate a scaled torque command 222. At process block 230, a first dynamic component is modeled as a filter and multiplied by the scaled torque command 222 to formulate a filtered torque command 232 and the first term of the right hand side of Equation (11).

Also received by the process 200 is the electrical motor velocity $\omega_e$ (omega e) as depicted at process block 240. The electrical motor velocity $\omega_e$ (omega e) is multiplied by a quotient of $2K_e/N_p$ at process block 250 establishing the second term of Equation (11) denoted in the figure as 252. The electrical motor velocity $\omega_e$ (omega e) is also multiplied by a quotient of L/R at process block 260 to formulate a scaled motor velocity 262. The scaled motor velocity 262 is multiplied by the scaled torque command 222 at multiplier 270 and applied as a first input 272 to summer 280.

Also received by the process 200 is the phase advance angle δ (delta) as depicted at process block, 290. The sine of the phase advance angle δ (delta) is determined at process block 300, and thereafter, then multiplied by the fed back output voltage V at multiplier 310. This product constitutes a second input to the summer 280 for subtraction from the first input 272. It will be appreciated that this feed back portion is what facilitates an implementation in an exemplary embodiment of a solution for the implicit equation without an explicit solution. The resultant of the summer 280 constitutes the term in parentheses of the third term of Equation 11. The resultant of the summer is then transmitted to process block 320, where the second dynamic component modeled in this instance as a low pass filter (or delay). The resultant of process block 320 is then multiplied by the scaled motor velocity 262 at multiplier to formulate the complete third term of the right hand side of Equation (11) denoted in the figure as 332.

Continuing with FIG. 3, at summer 340, first term of the right hand side of Equation (11) denoted the filtered torque command 232 the second term of the right hand side of Equation (11), denoted as 252, and the third term of the right hand side of Equation (11) denoted as 332 are combined. The resultant of this summation is divided at process block 350 by the cosine of the phase advance angle δ (delta) as computed at process block 360. The resultant of the division yields the commanded voltage V.

It will be appreciated that process 200 provides an implicit solution to a non-linear equation with no explicit solution. Advantageously, in an exemplary embodiment, it is realized that an implicit solution is achieved employing a closed loop filtering technique. For the special case of δ (delta)=0 or 180 degrees (e.g., no phase advance), the sine term goes to zero and the cosine term goes to ±1 eliminating the feedback path and the final divide operation. For the special case of δ (delta) near 90 or 270 degrees, the cosine term will approach zero and the sine term will approach ±1. If operation is desired at this very unusual condition, the equation may be rearranged to solve for V sin(δ) and feed back V cos(δ).

In another embodiment, the nominal values for the resistance R, inductance L, and motor constant Ke may readily be scheduled or compensated for various environmental conditions including, but not limited to, temperature. The temperature signal 27 may be employed to schedule one or more of these parameters to enhance the accuracy of the model implementation. Referring once again to the figure, the temperature signal 27 may be received at process block 400 and applied to process block 410 where nominal values for one or more of the motor parameters may be scheduled as a function of the temperature. Scheduling may be accomplished in a variety of ways as disclosed elsewhere herein. In an exemplary embodiment, scheduling is achieved with a look-up table.

It will further be appreciated that the filter implementations disclosed herein are illustrative only and numerous alternatives will readily be apparent. For example, the computation for the first dynamic component at process block 230 is substantially a proportional plus derivative. Numerical methods for implementing a derivative all include some approximation and filtering, as a pure derivative is well known to be not readily implemented. For example, in a recursive process, subtracting the last value of a parameter from the current value and then dividing by the difference in time between the two samples. However, a derivative may also be implemented as a changing measured time interval for a fixed change in a parameter to perform a computation. Further, in yet another embodiment, both the interval of time and interval of the parameter could be measured and compared with neither of the parameters occurring at a fixed interval. In a preferred configuration, evaluation of a changing measured parameter over a fixed interval of time to perform the computation is utilized for simplicity. In another preferred configuration, the process is implemented as a lead filter.

It will be appreciated that while the disclosed embodiments may employ in several instances, look-up tables in implementation, such a reference is illustrative only and not limiting. Various alternatives will be apparent to those skilled in the art. For example, the processes and algorithms described above could employ, analog or digital implementations in addition to, or in lieu of, and software implementations including but not limited to look-up tables, direct algorithms, gain or parameter scheduling, linearized interpolation or extrapolation, and/or various other methodologies, which may facilitate execution of the desired functions and the like, as well as combinations thereof. It should further be noted that the particular configurations of algorithms are once again, illustrative only, a variety of other configurations or element allocations are feasible.

The system and methodology described in the numerous embodiments hereinbefore provides a method for controlling a voltage mode controlled electric machine. In addition, the disclosed invention may be embodied in the form of computer-implemented processes and apparatuses for practicing those processes. The present invention can also be embodied in the form of computer program code containing instructions embodied in tangible media 40, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium 40, loaded into and/or executed by a computer, or as data signal 42 transmitted, whether via modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for controlling an electric motor, the method comprising:
   receiving a torque value representative of a desired torque;
   obtaining a speed value indicative of a rotational velocity of said electric motor;
   acquiring a phase advance value indicative of a desired phase advance angle;
   providing closed-loop voltage mode control of the electric motor by generating a voltage command in response to a solution of a dynamic inverse motor model equation of said electric motor, utilizing said torque value, said speed value, and said phase advance value; wherein the dynamic inverse motor model equation specifies that a magnitude of a voltage applied to the electric motor is a function of at least one of a magnitude of a previously existing voltage or a magnitude of a presently existing voltage at the electric motor.

2. The method of claim 1 wherein said obtaining a speed value comprises receiving a position value and computing said speed value therefrom.

3. The method of claim 1 wherein said generating includes implementing a closed loop non-linear filter to solve said dynamic inverse motor model equation as an implicit equation, thereby providing said solution.

4. A method for controlling an electric motor, the method comprising:
   receiving a torque value representative of a desired torque;
   obtaining a speed value indicative of a rotational velocity of said electric motor;
   acquiring a phase advance value indicative of a desired phase advance angle; and
   providing closed-loop voltage mode control of the electric motor by generating a voltage command in response to a solution of a dynamic inverse motor model equation of said electric motor, utilizing said torque value, said speed value, and said phase advance value; wherein the dynamic inverse motor model equation specifies that a magnitude of a voltage applied to the electric motor is a function of at least one of a magnitude of a previously existing voltage or a magnitude of a presently existing voltage at the electric motor; and
   wherein said dynamic inverse motor model equation comprises:

$$V\cos(\delta) = \left(\frac{L}{R}s + 1\right)R\frac{T_e}{K_e} + K_e\omega_m + L\omega_e\left(\frac{L\omega_e T_e/K_e - V\sin(\delta)}{R\left(\frac{L}{R}s + 1\right)}\right)$$

where:
   V—is a magnitude of an applied Voltage
   δ—is an angle of said applied Voltage relative to a back emf
   α—is an angle of the Current relative to said back emf
   L—is a stator inductance
   R—is a stator resistance
   $K_e$—is a motor constant
   $T_e$—is a desired torque
   $\omega_m$—is a rotor mechanical velocity
   $\omega_e$—is a rotor electrical velocity
   s—is a Laplace operator.

5. The method of claim 1 further including receiving a temperature signal.

6. The method of claim 5 wherein said generating is responsive to said temperature signal.

7. The method of claim 6 wherein said generating includes scheduling a motor parameter as a function of said temperature signal.

8. A system for controlling an electric motor comprising:
   a PM voltage mode controlled electric motor,
   a sensor operably connected to said electric motor and configured to measure at least one of a rotor velocity and a rotor position of said electric motor and transmit at least one of a velocity signal and a position signal;

a controller, said controller operably connected to said electric motor and said sensor, said controller receiving said at least one of a velocity signal and a position signal and generating a voltage command in response to a solution of a dynamic inverse motor model equation of said electric motor;

wherein the dynamic inverse motor model equation specifies that a magnitude of a voltage applied to the electric motor is a function of at least one of a magnitude of a previously existing voltage or a magnitude of a presently existing voltage at the electric motor; and wherein said voltage command is responsive to a desired torque value, a phase advance value, and said at least one of a velocity signal and a position signal.

9. The system of claim 8 wherein said controller computes a speed value responsive to said position signal.

10. The system of claim 8 wherein said controller includes a closed loop non-linear filter to solve said dynamic inverse motor model equation as an implicit equation, thereby providing said solution.

11. A system for controlling an electric motor comprising:

a PM voltage mode controlled electric motor;

a sensor operably connected to said electric motor and configured to measure at least one of a rotor velocity and a rotor position of said electric motor and transmit at least one of a velocity signal and a position signal;

a controller, said controller operably connected to said electric motor and said sensor, said controller receiving said at least one of a velocity signal and a position signal and generating a voltage command in response to a solution of a dynamic inverse motor model equation of said electric motor;

wherein the dynamic inverse motor model equation specifies that a magnitude of a voltage applied to the electric motor is a function of at least one of a magnitude of a previously existing voltage or a magnitude of a presently existing voltage at the electric motor; and wherein said voltage command is responsive to a desired torque value, a phase advance value, and said at least one of a velocity signal and a position signal;

wherein said controller includes a closed loop non-linear filter to solve said dynamic inverse motor model equation as an implicit equation, thereby providing said solution; and wherein said dynamic inverse motor model equation comprises:

$$V\cos(\delta) = \left(\frac{L}{R}s + 1\right)R\frac{T_e}{K_e} + K_e\omega_m + L\omega_e\left(\frac{L\omega_e T_e/K_e - V\sin(\delta)}{R\left(\frac{L}{R}s + 1\right)}\right)$$

where:
V—is a magnitude of an applied Voltage
δ—is an angle of said applied Voltage relative to a back emf
α—is an angle of a Current relative to said back emf
L—is a stator inductance
R—is a stator resistance
$K_e$—is a motor constant
$T_e$—is a desired torque
$\omega_m$—is a rotor mechanical velocity
$\omega_e$—is a rotor electrical velocity
s—is a Laplace operator.

12. The system of claim 8 wherein said voltage command is responsive to frequency responsive dynamic terms implemented as filters.

13. The system of claim 8 further including a temperature sensor in operable communication with said controller and transmitting a temperature signal.

14. The system of claim 13 wherein said voltage command is responsive to said temperature signal.

15. The system of claim 14 wherein said voltage command is responsive to a scheduled a motor parameter as a function of said temperature signal.

16. A storage medium encoded with a computer program code including instructions for causing a controller to implement a method for controlling a voltage mode controlled electric motor, the method comprising:

receiving a torque value representative of a desired torque;

obtaining a speed value indicative of a rotational velocity of said electric motor;

acquiring a phase advance value indicative of a desired phase advance angle;

generating a voltage command in response to a solution of a dynamic inverse motor model equation of said electric motor, utilizing said torque value, said speed value, and said phase advance value;

wherein the dynamic inverse motor model equation specifies that a magnitude of a voltage applied to the electric motor is a function of at least one of a magnitude of a previously existing voltage or a magnitude of a presently existing voltage at the electric motor.

* * * * *